US008335516B2

(12) United States Patent
Lee et al.

(10) Patent No.: US 8,335,516 B2
(45) Date of Patent: Dec. 18, 2012

(54) METHOD AND APPARATUS FOR TRANSMITTING DATA IN WIRELESS NETWORK

(75) Inventors: Jae-wook Lee, Seoul (KR); Sung-kwan Heo, Seoul (KR); Sang-bum Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1273 days.

(21) Appl. No.: 11/599,485

(22) Filed: Nov. 15, 2006

(65) Prior Publication Data

US 2007/0124626 A1 May 31, 2007

(30) Foreign Application Priority Data

Nov. 15, 2005 (KR) .................. 10-2005-0109266

(51) Int. Cl.
*H04W 72/00* (2009.01)
(52) U.S. Cl. ............... 455/452.2; 455/421; 370/336; 370/349; 370/394; 370/913; 714/704
(58) Field of Classification Search .............. 370/336, 370/349, 913, 394; 714/704
See application file for complete search history.

(56) References Cited

U.S. PATENT DOCUMENTS

| 5,561,445 | A | 10/1996 | Miwa et al. |
| 5,850,213 | A | 12/1998 | Imai et al. |
| 6,807,428 | B2 * | 10/2004 | Casaccia ............... 455/515 |
| 6,975,599 | B1 * | 12/2005 | Johnson et al. ......... 370/278 |
| 2003/0005382 | A1 | 1/2003 | Chen et al. |
| 2003/0076304 | A1 | 4/2003 | Smyth |
| 2003/0174707 | A1 | 9/2003 | Grob et al. |
| 2004/0160414 | A1 | 8/2004 | Armstrong |
| 2005/0265450 | A1 * | 12/2005 | Raveendran et al. .... 375/240.15 |
| 2006/0150055 | A1 * | 7/2006 | Quinard et al. ......... 714/752 |

FOREIGN PATENT DOCUMENTS

| CN | 1286553 A | 3/2001 |
| JP | 07264077 | 10/1995 |
| JP | 9-116559 A | 5/1997 |
| JP | 2004-164409 A | 6/2004 |
| JP | 2005-252622 A | 9/2005 |
| KR | 1020020000745 A | 1/2002 |

(Continued)

OTHER PUBLICATIONS

Kurimoto, Masakazu et al. "Low Error-Rate Transmission with Dynamic Interleaving at Transport Level for Video Streaming Service" Technical Report of IEICE, Feb. 27, 2004, vol. 103, No. 690, pp. 179-182.

Office Action issued Mar. 30, 2010, in counterpart Japanese Application No. 2006-303989.

(Continued)

*Primary Examiner* — Vladimir Magloire
(74) *Attorney, Agent, or Firm* — Sughrue Mion, PLLC

(57) ABSTRACT

A data transmission method and apparatus encodes data to be transmitted over a wireless network on a unit basis, and provides the transmission data with information for allowing the transmission data to recover from an error being added thereto, transmits the transmission data to the wireless network, calculates a transfer success ratio depending on whether the transmission data have been successfully transmitted, and controls the transmission of the transmission data depending on whether the transfer success ratio is higher than a threshold value.

22 Claims, 9 Drawing Sheets

FOREIGN PATENT DOCUMENTS

| | | |
|---|---|---|
| KR | 10-2005-0035730 A | 4/2005 |
| KR | 10-2005-0049318 A | 5/2005 |
| KR | 1020050043302 A | 5/2005 |
| KR | 1020060091607 A | 8/2006 |
| WO | 0076148 A1 | 12/2000 |
| WO | WO 2004030266 A1 * | 4/2004 |

OTHER PUBLICATIONS

Suzuki, Hideharu et al. "A study of FEC/ARQ Hybrid Control Techniques for Reliable Multicast in Wireless Networks" Mar. 8, 2002. pp. 75-82.

* cited by examiner

METHOD AND APPARATUS FOR TRANSMITTING DATA IN WIRELESS NETWORK

CROSS-REFERENCE TO RELATED APPLICATION

This application is based on and claims priority from Korean Patent Application 2005-0109266, filed on Nov. 15, 2005, the disclosure of which is incorporated herein in its entirety by reference.

BACKGROUND OF THE INVENTION

1. Field of the Invention

The present invention relates to the transmission of video data in a wireless network, and more particularly, to a data transmission method and apparatus efficiently using the resources of a wireless network at the time of transmission of video data.

2. Description of the Related Art

With the development and popularization of wireless communication technologies such as Institute of Electrical and Electronic Engineers (IEEE) 802.11a/b/g, Code Division Multiple Access (CDMA) 2000, Universal Mobile Telecommunications System (UMTS), and Wireless Broadband (WiBro), it is expected that home networks and the wireless Internet will be used widely. It is also expected that video streaming will be the killer application for these services. More particularly, as a broadcasting system, such as Digital Multimedia Broadcasting (DMB), is constructed, the importance of video streaming in wireless communication has become greater.

In the wireless network, packets are frequently lost because of unstable channel conditions. This may cause a problem with video quality on a receiving side.

To eliminate the video quality problem on a user side, a method of retransmitting lost packets or retransmitting packets at a slow transfer rate has been conventionally used. In more detail, if the transmission of a specific packet fails at the time of transmitting a data frame, a video transmission apparatus stops the transmission of other packets. The video transmission apparatus then retransmits the packet that has not been transmitted until it is transmitted successfully. If the packet that has not been transmitted is not transmitted successfully after retransmission has been attempted a previously set number of times, a transmitting side retransmits the packet at a lowered packet transfer rate. If the packet is transmitted successfully through the above process, the video transmission apparatus transmits subsequent packets.

However, the conventional data transmission method emphasizes preserving the integrity of transmitted data by utilizing a specified bandwidth to the greatest extent. Accordingly, a problem arises because the conventional data transmission method does not use limited wireless network resources efficiently.

To solve the problem, several inventions, such as U.S. Patent Application Publication No. 2003-0005382 "System and Method for Frame Transmission in Broadcast Communication System," have been proposed. However, the problem still remains unsolved.

In view of the above, there is a need for a data transmission method and apparatus which can efficiently use the limited resources of a wireless network at the time of transmitting video data over the wireless network.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Accordingly, the present invention has been made keeping in mind the above problems occurring in the prior art, and aspects of the present invention provide a data transmission method and apparatus that can efficiently use the resources of a wireless network at the time of transmitting data.

The present invention provides a data transmission method, including encoding data to be transmitted over a wireless network on a unit basis, and providing the transmission data with information for allowing the transmission data to recover from an error being added thereto, transmitting the transmission data to the wireless network, calculating a transfer success ratio depending on whether the transmission data have been successfully transmitted, and controlling the transmission of the transmission data depending on whether the transfer success ratio is higher than a threshold value.

The present invention also provides a data transmitting apparatus, including a video data processing unit encoding data to be transmitted through a wireless network on a unit basis, and providing transmission data with information for allowing data to be transmitted to recover from an error being added, a transmission unit transmitting the transmission data to the wireless network, a calculation unit calculating a transfer success ratio of the transmission data; and a determination unit controlling the transmission of the transmission data depending on whether the transfer success ratio is higher than a threshold value.

BRIEF DESCRIPTION OF THE DRAWINGS

The above and other features and advantages of the present invention will be more clearly understood from the following detailed description taken in conjunction with the accompanying drawings, in which.

DESCRIPTION OF THE EXEMPLARY EMBODIMENTS

Figure 1:
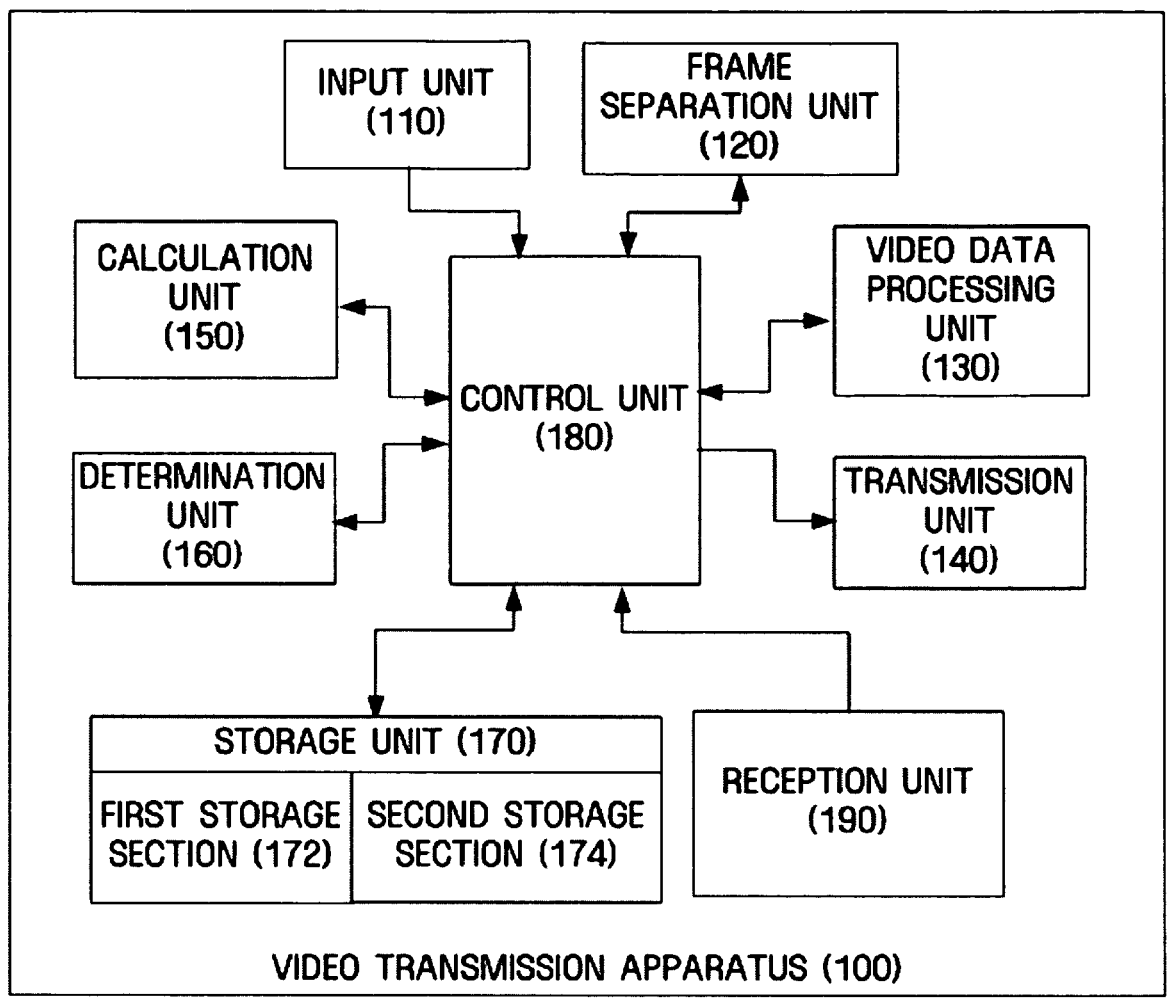
FIG. 1 is a block diagram illustrating the construction of a video transmission apparatus according to a first exemplary embodiment of the present invention.

These and other objects of the present application will become more readily apparent from the detailed description given hereinafter. However, it should be understood that the detailed description and specific examples, while indicating exemplary embodiments of the invention, are given by way of illustration only, since various changes and modifications within the spirit and scope of the invention will become apparent to those skilled in the art from this detailed description. In describing the accompanying drawings, like reference numerals designate like elements throughout the specification.

The present invention will now be described in detail in connection with exemplary embodiments with reference to the drawings for block diagrams and processing flowcharts illustrating a data transmission method and apparatus in a wireless network. It is to be understood that each block of the processing flowchart drawings and a combination of the flowchart drawings can be executed by computer program instructions. The computer program instructions can be loaded into the processing unit of a general-purpose computer, a special purpose computer, and other programmable data processing equipment. Therefore, the instructions executed by the processing units of the computers or other programmable data processing equipment create means for performing functions described in flowchart block(s). The computer program instructions can be stored in a computer-available or computer readable memory that can be provided to the computer or other programmable data processing equipment in order to implement the functions in a specific manner. Therefore, the instructions stored in the computer-available or computer readable memory can produce manufacturing articles including the instruction means for performing the functions described in the flowchart block(s). Since the computer program instructions can be mounted on the computer or other programmable data processing equipment, a series of operating steps is performed on the computer or other programmable data processing equipment to create a process executed by the computer. Accordingly, the instructions that execute on the computer or other programmable data processing equipment can be provided as steps of executing the functions described in the flowchart block(s).

Furthermore, each block may represent a part of a module, segment or code, which includes one or more executable instructions for executing specific logical function(s). In addition, it is to be noted that in several alternative exemplary embodiments, the functions described in the blocks can be performed out of order. For example, two blocks that are sequentially shown may be performed substantially at the same time or may be performed in reverse order according to a corresponding function.

FIG. 1 is a block diagram illustrating the construction of a video transmission apparatus 100 according to a first exemplary embodiment of the present invention.

The term "~unit" used in the exemplary embodiments, such as "~module" and "~table", refers to software and hardware constituent elements, such as a Field Programmable Gate Array (FPGA) or an Application Specific Integrated Circuit (ASIC). The module performs functions. However, this does not mean that the module is limited to software or hardware. The module may be configured to exist in a storage medium which is addressable and may be configured to execute on one or more processing units. For example, the module may include constituent elements, such as software constituent elements, object-oriented software constituent elements, class constituent elements and task constituent elements, processes, functions, attributes, procedures, subroutines, segments of program code, drivers, firmware, microcodes, circuits, data, databases, data structures, tables, arrays, and parameters. Functions provided within the constituent elements and the modules may be combined with a smaller number of constituent elements and modules or may be separated into additional constituent elements and modules. Furthermore, the constituent elements and the modules may be implemented to execute on one or more CPUs within a device.

The video transmission apparatus 100 shown in FIG. 1 includes an input unit 110, a frame separation unit 120, a video data processing unit 130, a transmission unit 140, a calculation unit 150, a determination unit 160, a storage unit 170, a control unit 180, and a reception unit 190.

The input unit 110 receives video data such as MPEG data.

The frame separation unit 120 separates the video data, input through the input unit 110, on a frame basis. For example, MPEG video data may be separated into I, B, and P frames. In this case, when each piece of frame data is divided into MPEG TS (Transport Stream) packets, the frame separation unit 120 marks an I/P/B frame type in each TS packet.

Figure 2:
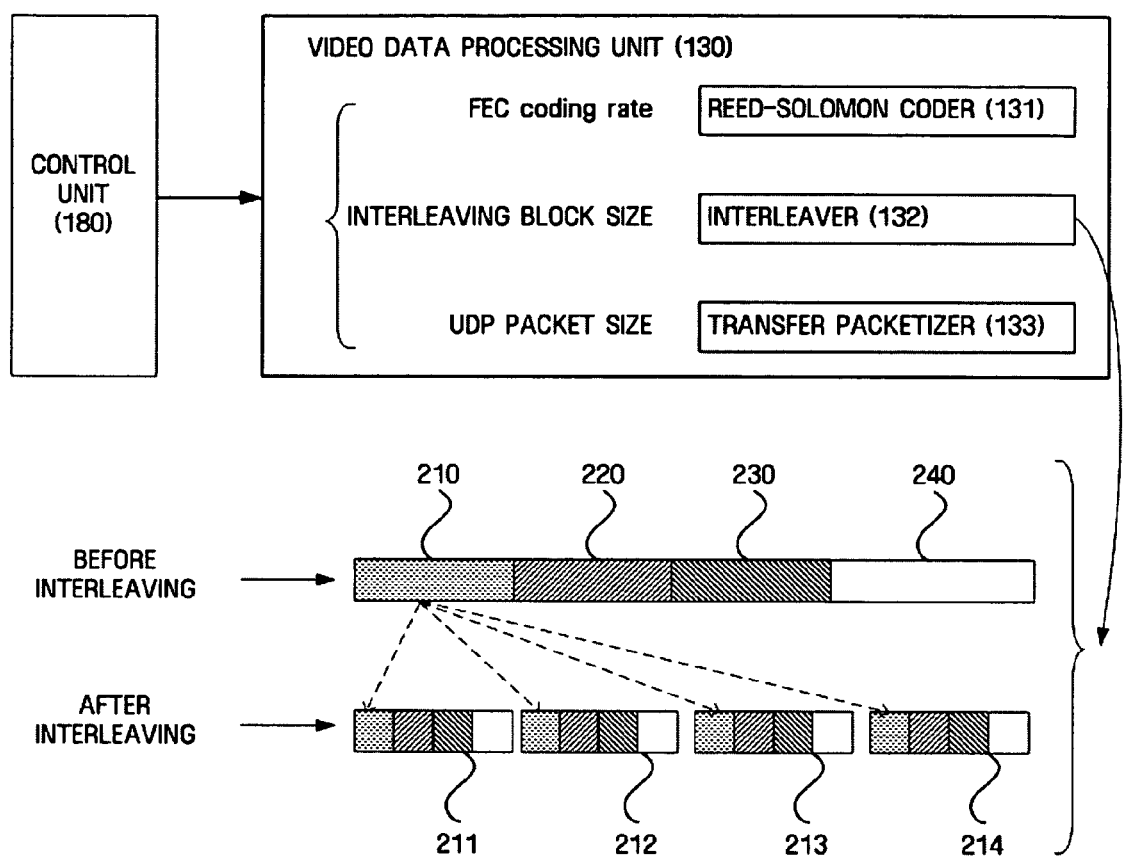
FIG. 2 is a block diagram illustrating the construction of a video data processing unit of the video transmission apparatus of FIG. 1 in detail.

The video data processing unit 130 processes the video data input through the input unit 110. FIG. 2 is a block diagram showing the video data processing unit 130 in detail.

The video data processing unit 130 may include a coder 131, an interleaver 132, and a transfer packetizer 133.

The coder 131 encodes frame data using Forward Error Correction (FEC). FEC refers to a method of adding data having a given size to frame data and recovering data which has been lost, or data in which an error has occurred, using the added data. The encoding algorithm based on FEC may include a Reed-Solomon coding algorithm and a Viterbi algorithm.

In the case where the Reed-Solomon algorithm is used, when the size of actual data is K bytes and encoded data is N bytes, the encoding rate may be represented by RS (N, K). The size R of data added according to the encoding is N−K. In the Reed-Solomon algorithm, when the number of generated errors is smaller than R/2, data can be recovered. That is, the larger the size of R, the greater the range in which errors can be recovered from. However, N must increase in order to increase R. This means that the amount of data to be transmitted is increased.

In the coder 131, the size of data added at the time of encoding (i.e., data which can recover from the following error) may be differentially added depending on the importance of a frame. For example, the coder 131 may add a larger amount of recovery data to the I frame than to other frames. This is because the I frame is the frame to which the B frame and the P frame refer. If an error occurs in the I frame, errors also occur in the B frame and the P frame, which refer to the I frame.

Furthermore, the coder 131 can control the method of encoding data depending on the status of the wireless network. For example, if the error occurrence rate of transmitted packets is low, the coder 131 can reduce the amount of data added at the time of encoding. Alternatively, the coder 131 can change the encoding method such that recovery data are added only to the I frame, but are not added to the P frame.

The interleaver 132 interleaves encoded frame data. The term "interleaving" refers to a method of dividing each packet into several blocks and integrating the divided blocks with the blocks of other packets to produce new packets. That is, as shown in FIG. 2, encoded frame data including packets 210, 220, 230, and 240 are divided into several blocks. Parts of the packets 210, 220, 230, and 240 are stored in the packet 211 and are also stored in the packets 212, 213, and 214. If interleaving is performed as described above, it is possible to prevent the entire frame or video data from being lost due to an erroneous packet even though an error occurs on a packet basis at the time of transmitting the packets.

In FIG. 2, if the packet 210 is lost at the time of transmitting packets without performing interleaving, all of the specific data of a frame existing in the packet 210 is lost. However, if the packets are transmitted after interleaving has been carried out, only parts of the packets 210, 220, 230, and 240 are lost, even though the packet 211 is lost. In other words, the entire frame or all of the video data can be prevented from being lost because an error caused by the loss of the packet 211 is distributed among the remaining packets 220, 230, and 240. Furthermore, according to the Reed-Solomon algorithm, when the amount of error occurring in each frame data is smaller than R/2, lost data can be recovered using FEC.

Meanwhile, when encoded data is interleaved, the size of an interleaving block may be controlled depending on the status of the wireless network. For example, when the error occurrence rate of the wireless network is high, the interleaver 132 may set the size of the interleaving block to a small value. In contrast, when the error occurrence rate of the wireless network is low, the interleaver 132 may set the size of the interleaving block to a large value.

The transfer packetizer 133 serves to divide the interleaved frame data into several packets and add a sequential number to the header of each packet. Such sequential numbers are used to sort data received by a video reception apparatus 400 to be described later. That is, if the sequence in which packets are transmitted from the video transmission apparatus 100 and the sequence in which packets are received by the video reception apparatus 400 are different, the video reception apparatus 400 sorts the packets using the sequential numbers.

When the interleaved data is packetized, the size of a UDP packet may be controlled depending on the status of the wireless network. For example, when the error occurrence rate of the wireless network is high, the size of the UDP packet can be reduced. In contrast, when the error occurrence rate of the wireless network is low, the size of the UDP packet can be increased.

The transmission unit 140 classifies the packets depending on their importance, and transmits the classified packets. To this end, the transmission unit 140 may include a plurality of priority queues. That is, the transmission unit 140 stores the packets in different priority queues according to displayed frame types and transmits the packets to the video reception apparatus 400.

Meanwhile, the transmission unit 140 transmits the packets according to preset transfer parameters. The transfer parameters may include a retry limit necessary for retransmitting packets the transmission of which has failed, a data transfer rate and a Maximum Transfer Unit (MTU) indicating the greatest amount of data that can be transmitted at once. The transfer parameters may be controlled depending on the status of the wireless network. When the error occurrence rate of the wireless network is high, the MTU may be reduced. In contrast, when the error occurrence rate of the wireless network is low, the MTU may be increased.

If the packets are transmitted through the transmission unit 140, the calculation unit 150 calculates a packet transfer success ratio for a frame including the transmitted packets.

For example, if packets constituting the I frame have been transmitted through the transmission unit 140, the calculation unit 150 calculates the ratio of packets that have been successfully transmitted to all of the packets constituting the I frame. The calculation unit 150 then provides relevant information to the determination unit 160.

The determination unit 160 determines whether the packet transfer success ratio received from the calculation unit 150 is higher than a threshold value and controls packet transmission according to the results of the determination. That is, the determination unit 160 may complete the packet transmission of frame data including a corresponding packet and transmit the packets of subsequent frame data, or may retransmit a packet the transmission of which has failed. This will be described in more detail with reference to FIG. 6.

The storage unit 170 includes a first storage section 172 and a second storage section 174.

The first storage section 172 stores an encoding rate, an interleaving block size, a UDP packet size, and transfer parameters related to packet transmission, such as information about a data transfer rate, an MTU, and a retry limit. The first storage section 172 also stores the error recovery ratio depending on the encoding rate and the threshold value for the packet transfer success ratio. The parameters may be tabled and stored, as shown in Table 1.

Table 1 shows error recovery ratios depending on encoding rates and threshold values for the packet transfer success ratios when the Reed-Solomon coding algorithm is applied.

TABLE 1

| Encoding rate RS(N, K) | Number of allowed errors (N − K) | Error recovery ratio $\{(N-K)/2\} *$ 100/N | Threshold value for packet transfer success ratio (100 − error recovery ratio) |
|---|---|---|---|
| RS(255, 95) | 80 | 31.4% | 68.6% |
| RS(255, 127) | 64 | 25% | 75% |
| RS(255, 191) | 32 | 12.5% | 87.5% |
| RS(255, 223) | 16 | 6.27% | 93.73% |
| RS(255, 239) | 8 | 3.14% | 96.86% |

From Table 1, it can be seen that when the I frame is encoded at an encoding rate of RS(255,127) (unit:byte), the threshold value for the packet transfer success ratio is 75%. This means that when the I frame is packetized into twelve packets by the transfer packetizer 133, the video reception apparatus 400 can recover data when nine or more packets are transmitted successfully.

The second storage section 174 stores packets, the transmission of which failed at the time of packet transmission. The storage unit 170 may be implemented using at least one of a non-volatile memory device such as Read Only Memory (ROM), Programmable ROM (PROM), Erasable Programmable ROM (EPROM), Electrically Erasable Programmable ROM (EEPROM) and flash memory, a volatile memory device such as Random Access Memory (RAM), and a storage medium such as a Hard Disk Drive (HDD), but is not limited thereto.

The reception unit 190 receives information about the status of the wireless network from the video reception apparatus 400. Information about the status of the wireless network may include information about the packet transfer ratio and the error occurrence rate. The information about the status of the wireless network input to the reception unit 190 is provided to the control unit 180.

The control unit 180 serves to control the constituent elements of the video transmission apparatus 100 according to the status of the wireless network. For example, the control unit 180 may control the transmission unit 140 in order to control the data transfer rate, the MTU, etc. In the case of IEEE 802.11a, the control unit 180 may provide a variety of data transfer rates, such as 54 Mbps, 48 Mbps, 36 Mbps, 24 Mbps, and 11 Mbps. If the error occurrence rate of the wireless network is low, the control unit 180 may set the data transfer rate to 54 Mbps. However, if the error occurrence rate of the wireless network is high, the control unit 180 may set the data transfer rate to a value lower than 54 Mbps.

Furthermore, the control unit 180 may adaptively set the retry limit of data stored in the second storage section 174 (i.e., packets the transmission of which has failed) according to the status of the wireless network. For example, if the error occurrence rate of the wireless network is high, the control unit 180 may set the packet retry limit to a high value. If the error occurrence rate of the wireless network is low, the control unit 180 may set the packet retry limit to a low value. Furthermore, the control unit 180 may set the retry limit adaptively depending on the importance of data. In other words, the retry limit of data with high importance (for example, the I frame) may be set to a high value because the I frame has an effect on other frames if it is lost. However, the retry limit of the B frame may be set to a low value because the B frame does not significantly influence other frames if it is lost.

Figure 3:
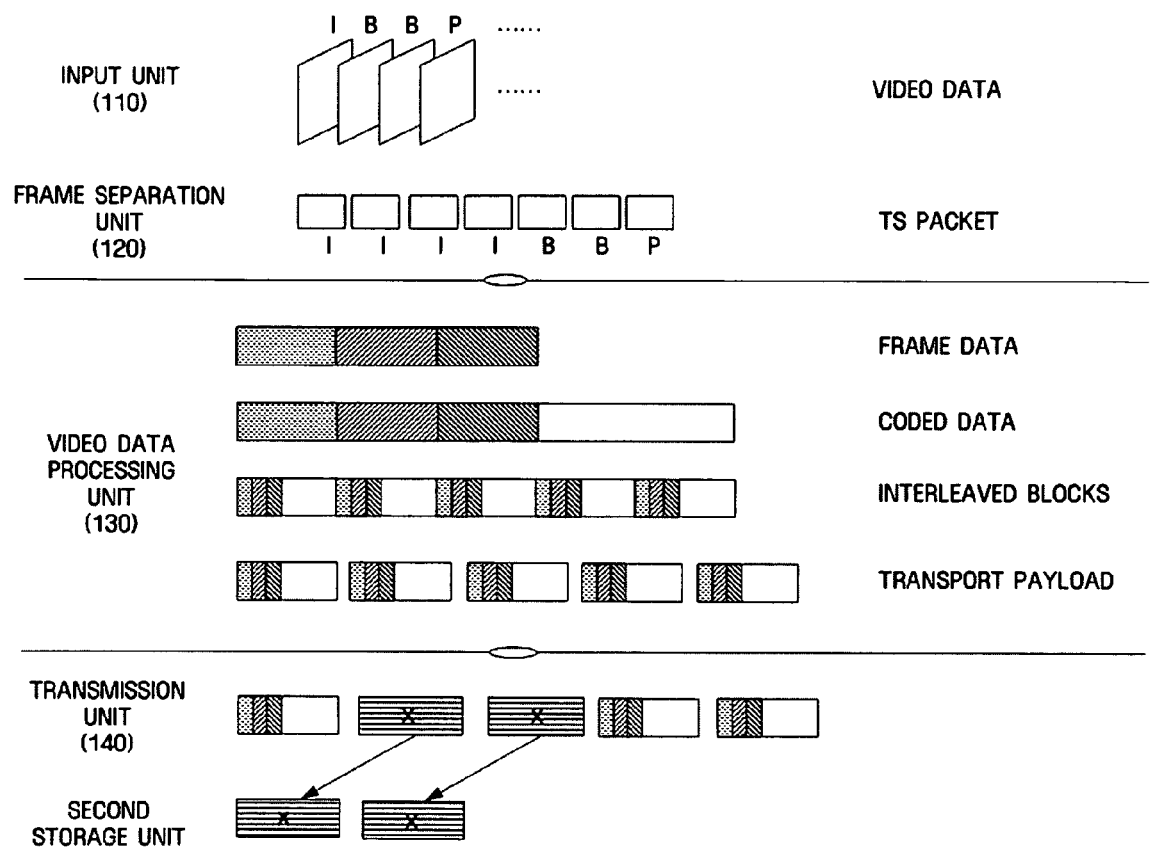
FIG. 3 is a diagram illustrating an example of data flow in a video transmission apparatus according to a first exemplary embodiment of the present invention.

FIG. 3 illustrates data flow in the video transmission apparatus 100 according to an embodiment of the present invention.

Referring to FIG. 3, video data input through the input unit 110 are separated on a frame basis by the frame separation unit 120. For example, MPEG video data may be separated into I, B, and P frames. When the separated frame data is divided into MPEG TS packets, a corresponding frame type is marked on each TS packet.

The TS packet on which a corresponding frame type is marked is encoded according to an encoding rate preset by the coder 131. In other words, the TS packet is encoded according to an encoding rate set according to the importance of each frame type.

The encoded data is divided into several blocks according to an interleaving block size set to fit the status of a wireless network. The blocks are then combined together.

Interleaved frames are added with a sequential number by the transfer packetizer 133 and are classified into packets. The classified packets are transmitted to the video reception apparatus 400 through the transmission unit 140. At the time of transmission of the packets, when the packet transfer success ratio for a corresponding frame is higher than a threshold value, the transmission of a packet for a corresponding frame is stopped and the packets of a subsequent frame are then transmitted. Furthermore, at the time of transmission of the packets, packets the transmission of which has failed are stored in the second storage section 174. The packets stored in the second storage section 174 are retransmitted through the transmission unit 140 when the packet transfer ratio for a corresponding frame is lower than a preset threshold value and transmission on a frame basis has been completed.

Figure 4:
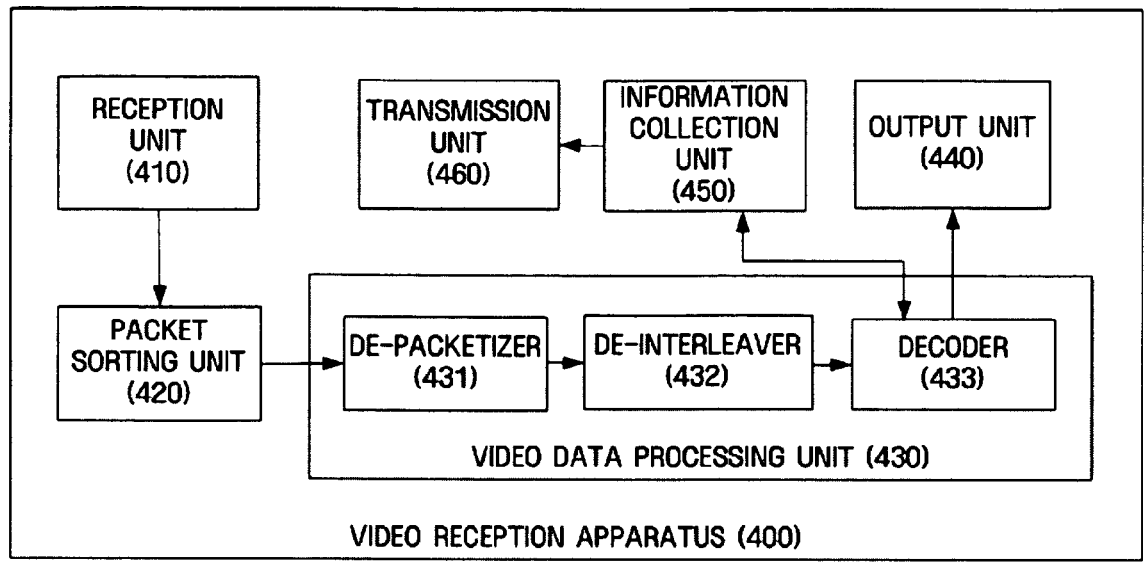
FIG. 4 is a block diagram illustrating the construction of the video reception apparatus according to a first exemplary embodiment of the present invention.

FIG. 4 is a block diagram showing the construction of the video reception apparatus 400 according to a first embodiment of the present invention.

The video reception apparatus 400 includes a reception unit 410, a packet sorting unit 420, a video data processing unit 430, an output unit 440 an information collection unit 450, and a transmission unit 460.

The reception unit 410 receives packets that have been transmitted and packets that have been retransmitted from the video transmission apparatus 100 through the wireless network. The received packets are stored in additional queues according to frame type.

The packet sorting unit 420 sorts packets that are not sequentially received with reference to sequential numbers included in the headers of received packets. The sorting method is to fetch a packet from each of the frame queues (not shown) and store a packet having the lowest sequential number in a sequence queue (not shown). Thereafter, the packet sorting unit 420 fetches a subsequent packet from a frame queue from which the first lowest packet is output, and compares the sequential numbers of the fetched packets with each other. This process is repeated until the respective frame queues become empty, thereby sorting all of the received packets.

The video data processing unit 430 serves to process the packets sorted by the packet sorting unit 420 and to play video data. The video data processing unit 430 includes a de-packetizer 431, a de-interleaver 432, and a decoder 433.

The de-packetizer 431 combines the received packets and generates frame data. At this time, the de-packetizer 431 determines dropped packets using information included in the header of each packet, such as the size of coded data and the sequential number, inserts an amount of dummy data corresponding to the size of the dropped packet, and generates frame data.

The de-interleaver 432 de-interleaves the frame data generated by the de-packetizer 431. When such de-interleaving is performed, the dummy data is distributed throughout the entire frame. It is therefore possible to prevent all of the data in a specific portion of a frame from being lost due to a lost packet.

The decoder 433 decodes the de-interleaved frame data. In other words, the decoder 433 extracts original video data using recovery information, which is added to allow the data to recover from an error in the video transmission apparatus 100.

The video output unit 440 outputs the video data processed by the video data processing unit 430.

The information collection unit 450 collects wireless network status information, such as the error occurrence rate after decoding.

The transmission unit 460 serves to transmit the wireless network status information, which is collected by the information collection unit 450, to the video transmission apparatus 100.

Figure 5:
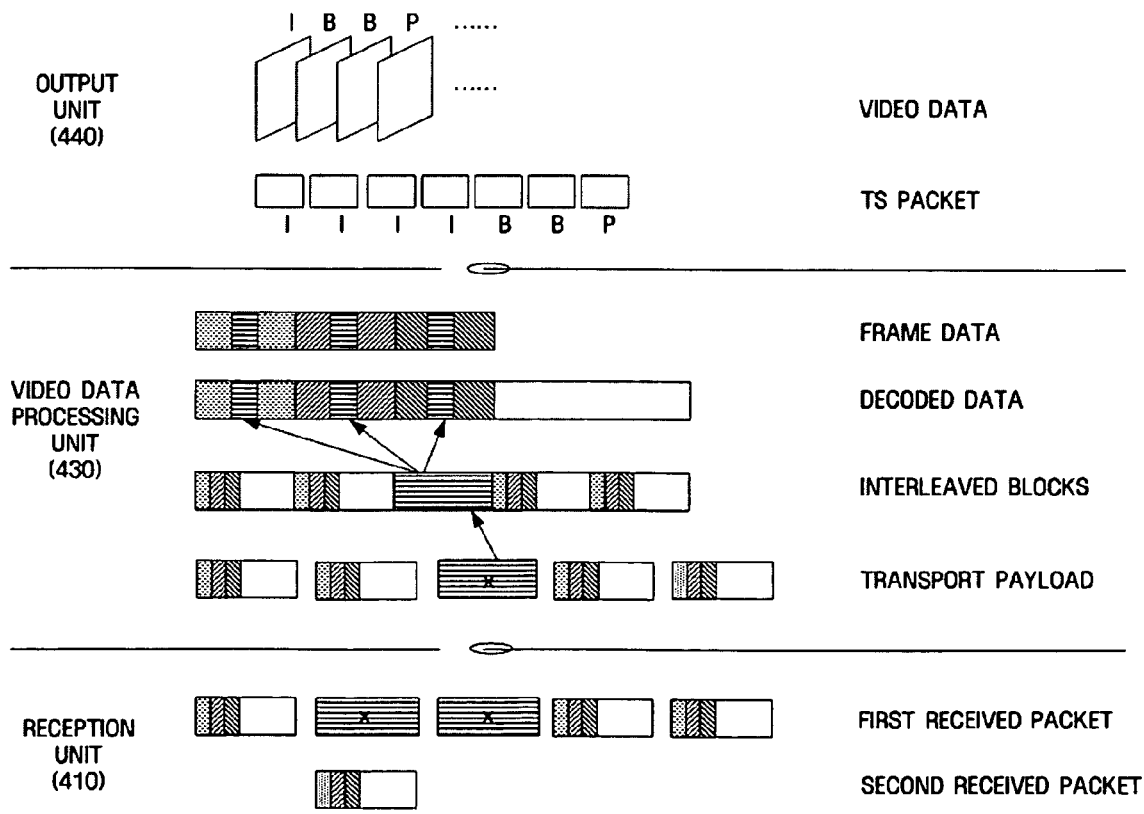
FIG. 5 is a diagram illustrating an example of data flow in the video reception apparatus according to a first exemplary embodiment of the present invention.

FIG. 5 illustrates data flow in the video reception apparatus 400 according to an exemplary embodiment of the present invention.

Referring to FIG. 5, the reception unit 410 of the video reception apparatus 400 receives packets from the video transmission apparatus 100. In this case, the reception unit 410 receives as many packets as can be recovered in the video reception apparatus 400. The packet sorting unit 420 sequentially sorts the received packets. Thereafter, the de-packetizer 431 inserts an amount of dummy data corresponding to the size of a corresponding packet at the location of a dropped packet, thus creating frame data. The de-interleaver 432 interleaves the frame data. The de-interleaved frame data are decoded by the decoder 433 and are then output through the video output unit 440.

A data transmission/reception method according to a first exemplary embodiment of the present invention will be described below with reference to FIGS. 6 and 7.

Figure 6:
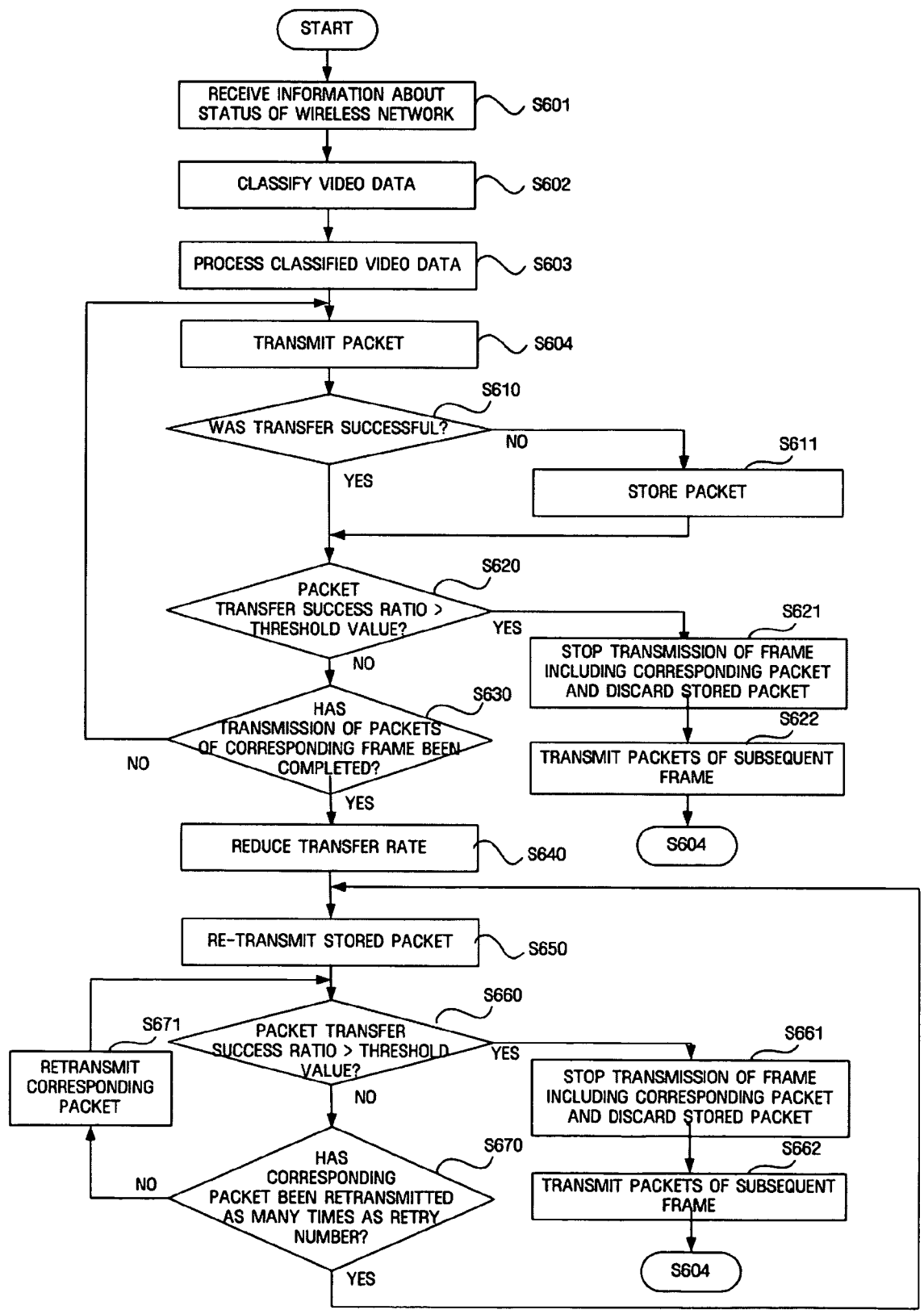
FIG. 6 is a flowchart illustrating a task processing procedure of the video transmission apparatus according to a first exemplary embodiment of the present invention.

FIG. 6 is a flowchart illustrating a task processing procedure in the video transmission apparatus 100 according to an exemplary embodiment of the present invention.

The control unit 180 first receives information about the status of the wireless network from the video reception apparatus 400 through the reception unit 190 at step S601. The information about the status of the wireless network may include information, such as the packet transfer ratio and the error occurrence rate. The control unit 180 sets a variety of parameters necessary for video data processing and a transfer parameter necessary for data transmission according to the received information about the status of the wireless network.

Thereafter, video data received through the video input unit 110 are classified on a frame basis at step S602. For example, MPEG video data may be classified into I, B, and P frames. The frame data classified on a type basis are divided into TS packets, are coded by the video processing unit, are interleaved, and are then packetized at step S603. At this time, the encoding rate, the interleaving block size, and the UDP packet size, which are set by the control unit 180 so as to be appropriate for the importance of the I/P/B frame types, are applied. For example, the I frame may be encoded at a high encoding rate in comparison with other frames since it has the highest importance.

In addition to the video frame, system information, a header, and an audio TS packet are transmitted. The system information and the header may be encoded according to the same importance level as the I frame. Also, the audio TS packet may be encoded so as to be included in each of the I/P/B frames.

The packets for which packetizing (i.e., the process of producing packets) has been completed are transmitted to the video reception apparatus 400 through the transmission unit 140 at step S604. Packets the transmission of which has failed are separately stored in the second storage section 174 at step S611.

Meanwhile, if the packets are transmitted through the transmission unit 140, the calculation unit 150 calculates the packet transfer success ratio for a frame including a corresponding packet and provides the calculated packet transfer success ratio to the determination unit 160. For example, if the transmitted packet is a packet of an I frame, the calculation unit 150 calculates the packet transfer success ratio for the I frame (i.e., the ratio of packets that have been successfully transmitted to the total number of packets constituting the I frame) and provides the calculated packet transfer success ratio to the determination unit 160.

The determination unit 160 determines whether the packet transfer success ratio received from the calculation unit 150 is higher than a threshold value at step S620. For example, when the I frame is encoded at an encoding rate of RS(255, 127), the determination unit 160 determines whether the packet transfer success ratio received from the calculation unit 150 is 75%. In more detail, when the I frame is packetized into twelve packets, the determination unit 160 determines whether nine or more packets have been transmitted successfully.

If it is determined that the packet transfer success ratio is higher than the threshold value (Yes at step S620), the determination unit 160 informs the transmission unit 140 thereof, so that it can stop the transmission of the packets of a corresponding frame at S621 and then transmit the packets of a subsequent frame at step S622.

For example, if packets from the first packet to the ninth of the twelve packets of the I frame, have been transmitted successfully, the determination unit 160 informs the transmission unit 140 thereof so that it can stop the transmission of packets for the I frame and can transmit the packets of a subsequent frame (for example, B frame). If packets. the first transmission of which has failed, are stored in the second storage section 174, the determination unit 160 causes the stored packets to be discarded at step S621.

On the other hand, if it is determined that the packet transfer success ratio is lower than the threshold value (No at step S620), the determination unit 160 determines whether the transmitted packet is the last packet of a corresponding frame at step S630. That is, the determination unit 160 determines whether all of the packets of a corresponding frame have been transmitted.

If it is determined that not all of the packets of a corresponding frame have been transmitted (No at step S630), the determination unit 160 causes the subsequent packets of a corresponding frame to be transmitted through the transmission unit 140 at step S604. For example, if packets from the first of the twelve packets of the I frame to the seventh, have been transmitted successfully, this means that the packet transfer success ratio is 75% or less and that not all the packets of the I frame have been transmitted. Therefore, the determination unit 160 causes a subsequent packet (i.e., the eighth packet of the I frame) to be transmitted.

If it is determined that all of the packets of a corresponding frame have been transmitted (Yes at step S630), the determination unit 160 causes packets stored in the second storage section 174 (i.e., packets the first transmission of which failed) to be retransmitted at step S650. For example, if the transmission of the twelfth packet failed after eight of the twelve packets of the I frame have been transmitted successfully, this means that the packet transfer success ratio is 75% or less and that all the packets of the I frame are transmitted. Therefore, the determination unit 160 causes one of the four packets stored in the second storage section 174 to be retransmitted. At this time, the retransmitted packets may be transmitted according to the sequence in which they were stored, or randomly.

Furthermore, the data transfer rate of the retransmitted packets may be set to a value lower than the initial data transfer rate at step S640. For example, if the initial data transfer rate was 54 Mbps, the retransmitted packets may be transmitted at a data transfer rate of 24 Mbps. If the data transfer rate of the retransmitted packets is set to a value lower than the initial data transfer rate as described above, the transfer success ratio of the retransmitted packets can be increased.

If the packets are retransmitted as described above, the determination unit 160 determines whether the packet transfer success ratio is higher than the threshold value at step S660.

If it is determined that the packet transfer success ratio is higher than the threshold value (Yes at step S660), the determination unit 160 causes all of the packets stored in the second storage section 174 to be discarded at step S661 and then causes the packets of a subsequent frame to be transmitted at step S662.

For example, if one of four packets stored in the second storage section 174 is successfully transmitted after retransmission, nine of the twelve packets are successfully transmitted and the packet transfer success ratio is 75% accordingly. This means that the video reception apparatus 400 can recover the I frame using the nine packets. Therefore, the determination unit 160 causes the four packets stored in the second storage section 174 to be discarded and then causes the packets of a subsequent frame (for example, B frame) to be transmitted.

If it is determined that the packet transfer success ratio is lower than the threshold value (No at step S660), the determination unit 160 determines whether a corresponding packet has been retransmitted a number of times corresponding to a specified retry limit at step S670.

If it is determined that the corresponding packet has not been retransmitted a number of times corresponding to the specified retry limit (No at step S670), the determination unit 160 causes the corresponding packet to be retransmitted a number of times corresponding to the specified retry limit at step S671. For example, in the case where the retry limit is set to three by the control unit 180, the determination unit 160 causes the first retransmitted packet to be retransmitted through the transmission unit 140 up to three times.

If it is determined that the corresponding packet has been retransmitted a number of times corresponding to the specified retry limit (Yes at step S670), the determination unit 160 causes a corresponding packet to be discarded or additionally stored, and then causes the others of the packets stored in the second storage section 174 to be retransmitted at step S650. Thereafter, the determination unit 160 repeats the above-mentioned steps S650 to S671.

Figure 7:
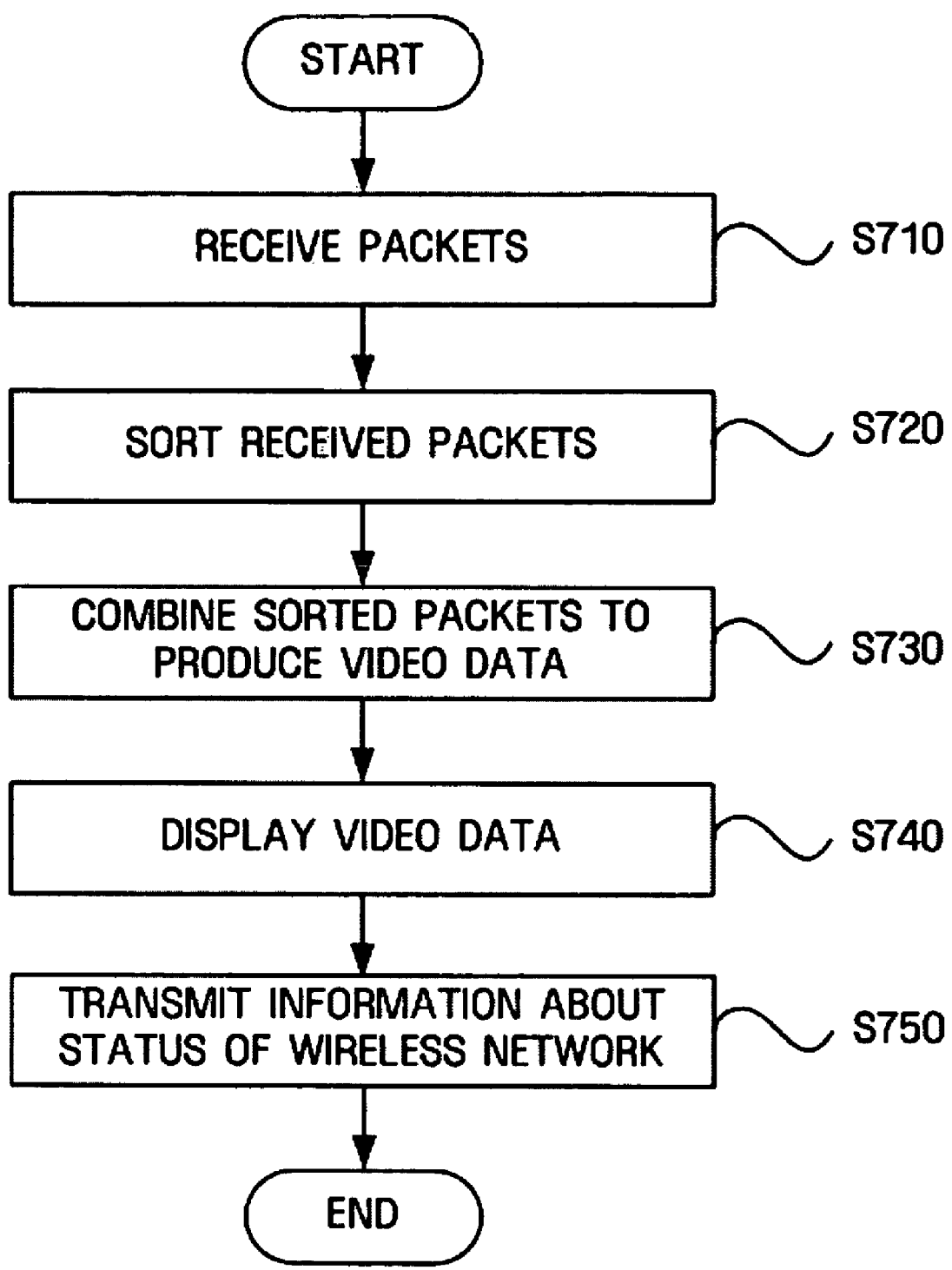
FIG. 7 is a flowchart illustrating a task processing procedure of the video reception apparatus according to a first exemplary embodiment of the present invention.

FIG. 7 is a flowchart illustrating a task processing procedure in the video reception apparatus 400 according to an exemplary embodiment of the present invention.

The reception unit 410 of the video reception apparatus 400 receives a number of packets corresponding to the number of packets that can be recovered from the video transmission apparatus 100 at step S710. The packet sorting unit 420 sequentially sorts the received packets at step S720. Thereafter, the de-packetizer 431 inserts an amount of dummy data corresponding to the size of a dropped packet at the location of the dropped packet, thus creating frame data at step S730. If the frame data is created, the frame data is de-interleaved by the de-interleaver 432, is decoded by the decoder 433, and is then displayed through the video output unit 440 at step S740.

Meanwhile, the information collection unit 450 of the video reception apparatus 400 calculates how many errors have occurred from the decoded data and generates information about the status of the wireless network. The information collection unit 450 transmits the status information to the video transmission apparatus 100 through the transmission unit 460 at step S750.

The construction and task processing procedure of a video transmission apparatus 800 according to a second exemplary embodiment of the present invention will be described below with reference to FIGS. 8 and 9.

Figure 8:
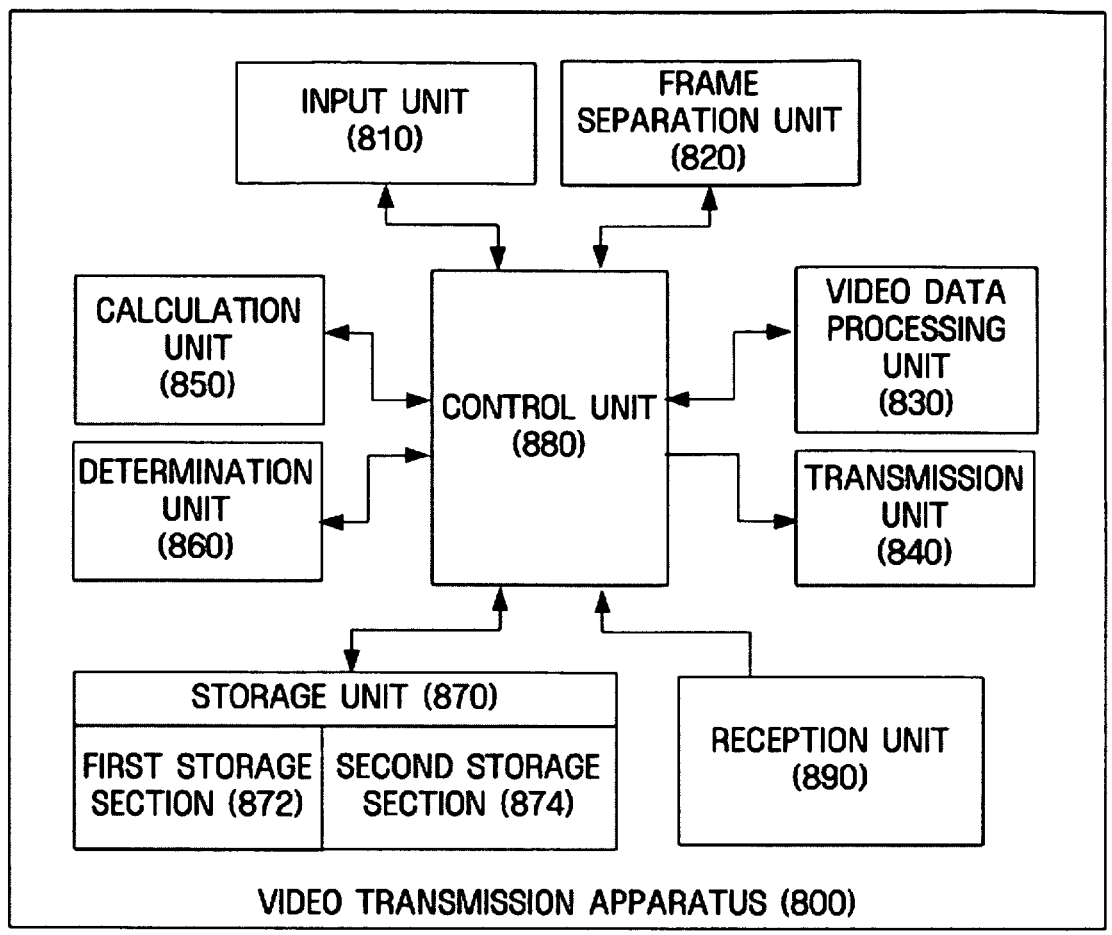
FIG. 8 is a block diagram illustrating the construction of a video reception apparatus according to a second exemplary embodiment of the present invention.
Figure 9:
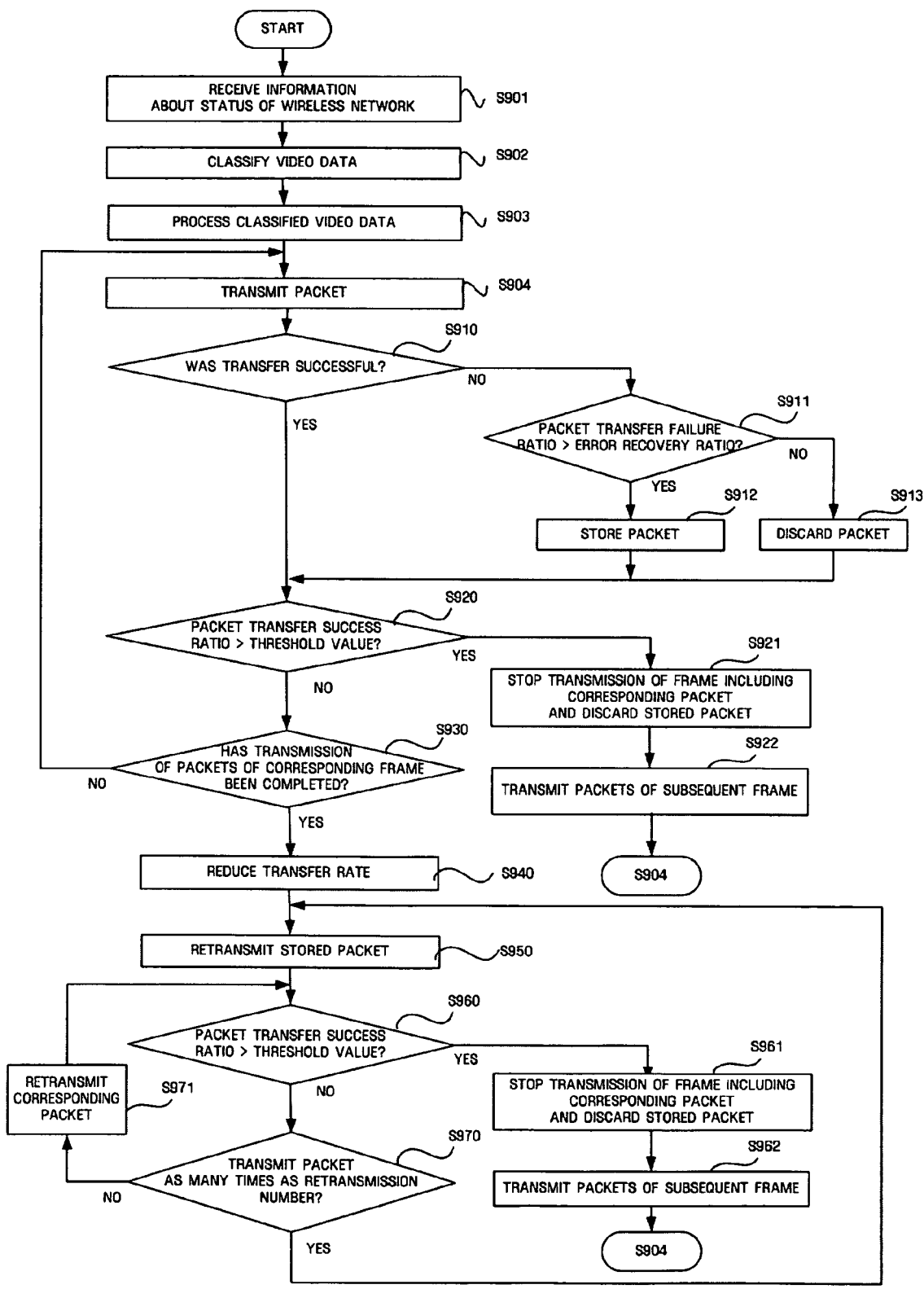
FIG. 9 is a flowchart illustrating a task processing procedure of the video reception apparatus according to a second exemplary embodiment of the present invention.

FIG. 8 is a block diagram illustrating the construction of the video reception apparatus 800 according to a second embodiment of the present invention. FIG. 9 is a flowchart illustrating the task processing procedure of the video reception apparatus 800 according to a second exemplary embodiment of the present invention.

The video transmission apparatus 800 according to the second exemplary embodiment of the present invention has the same construction as the video transmission apparatus 100 according to the first exemplary embodiment except for the following differences.

That is, if it is determined that the transmission of packets transmitted through a transmission unit 890 failed (No at step S910), a calculation unit 850 calculates a packet transfer failure ratio for a frame including the packets the transmission of which failed, and provides the calculated packet transfer failure ratio to a determination unit 860. For example, if the transmission of the packets of the I frame failed, the calculation unit 850 calculates a packet transfer failure ratio for the I frame (i.e., the ratio of packets that belong to all of the packets constituting the I frame and the transmission of which failed), and transmits the calculated packet transfer failure ratio to the determination unit 860.

The determination unit 860 determines whether the packet transfer failure ratio received from the calculation unit 850 is higher than an error recovery ratio at step S911. The determination unit 860 causes the packets, the transmission of which failed, to be stored in the second storage section 874 at step S912 or to be discarded at step S913 according to the results of the determination.

An example in which an I frame is encoded at an encoding rate of RS(255, 127) and is then packetized into 16 packets will be described.

If the transmission of the first of the 16 packets of the I frame failed, the calculation unit 850 calculates the packet transfer failure ratio based on the failed transmission of the first packet. In this case, the packet transfer failure ratio is about 6%.

The determination unit 860 then determines whether the packet transfer failure ratio received from the calculation unit 850 is higher than an error recovery ratio at step S911. That is, the determination unit 860 determines whether the packet transfer failure ratio is higher than 25%.

If it is determined that the packet transfer failure ratio is lower than 25% at step S911, the determination unit 860 causes the first packet to be discarded at step S913. Although the transmission of second, third, and fourth packets also failed, the packet transfer failure ratio is 25% or less. Therefore, the determination unit 860 causes all of the second, third, and fourth packets to be discarded at step S913.

If the transmission of the fifth packet also failed, the packet transfer failure ratio is 25% or more (Yes at step S911). Therefore, the determination unit 860 causes packets from the fifth packet to the sixteenth packets to be stored in the second storage section 874 at step S912. If packets, the transmission of which failed, are stored in this manner, the space of the second storage section 874 can be used more efficiently.

Figure 10:
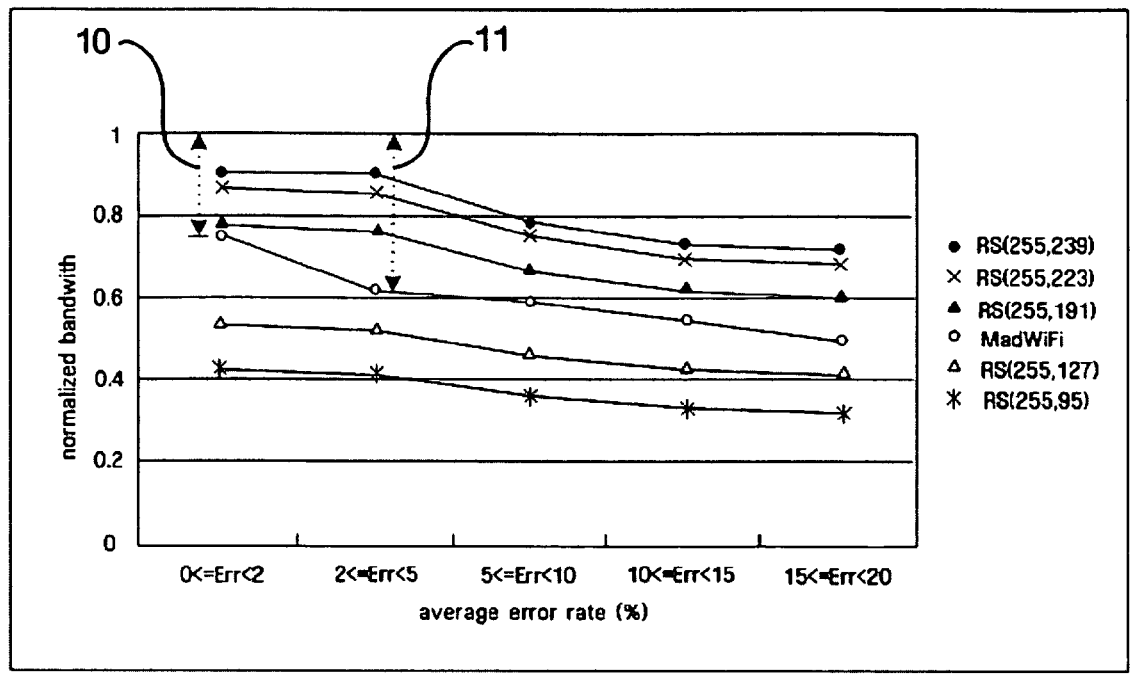
FIG. 10 is a graph illustrating the normalization of the frequencies of the bandwidth use of a wireless network depending on encoding rates.

FIG. 10 is a graph showing the normalization of the frequencies of the bandwidth use of a wireless network depending on encoding rates.

FIG. 10 illustrates an example in which bandwidths when there is no error in the wireless network are standardized to 1. From FIG. 10, it can be seen that when the average error rate is in a range from 0% to 20%, the higher the average error rate, the higher the bandwidth use rate. For instance, it can be seen that commercialized Multiband Atheros Driver for Wireless Fidelity (MadWiFi) uses a bandwidth 10 of about 0.22 when the average error rate is within a range from 0% to 2%, but uses a bandwidth 11 of about 0.4 when the average error rate is within a range from 0% to 5%.

It can also be seen that in the case where when video data are encoded at an encoding rate of RS(255,239), RS(255,223) or RS(255,191) at an average error rate (for example, an average error rate of 2% to 5%), they use less of the bandwidth of the wireless network in comparison with MadWiFi. This is because in MadWiFi, corresponding packets are retransmitted until packets, the transmission of which failed, are successfully transmitted, whereas in the exemplary embodiments of the present invention, the transmission of packets is controlled according to the packet transfer success ratio of transmitted packets.

Figure 11:
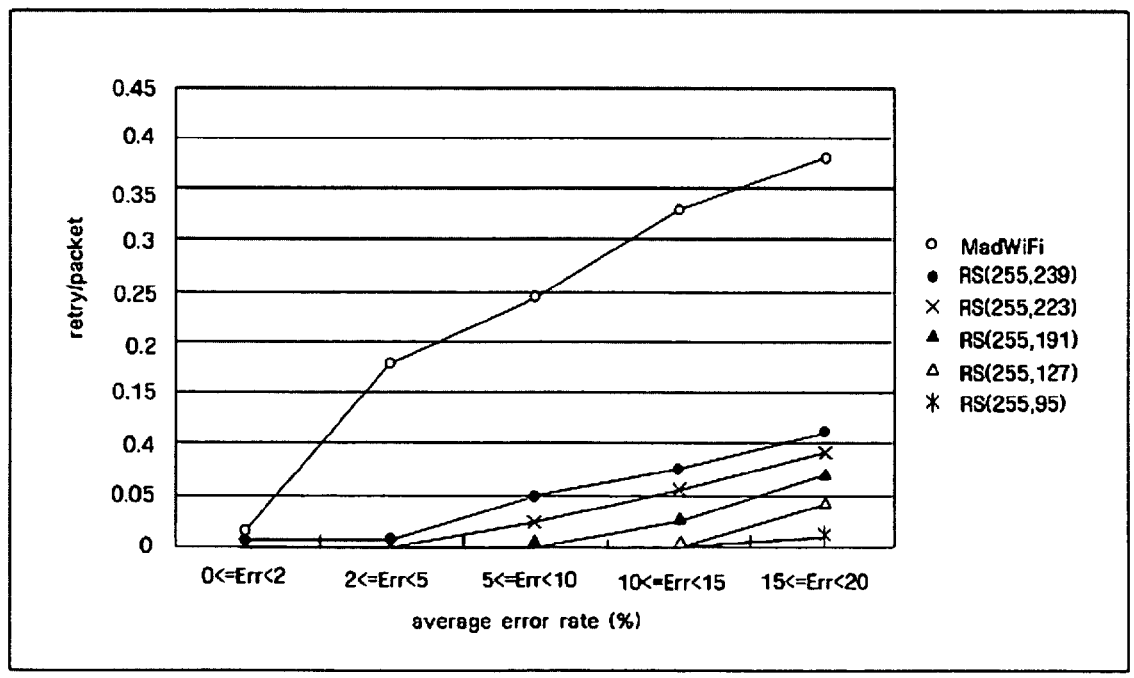
FIG. 11 is a graph illustrating retry rates per packet depending on encoding rates when data is transmitted according to the exemplary embodiment of the present invention.

FIG. 11 is a graph illustrating retry rates per packet depending on encoding rates when data is transmitted according to the exemplary embodiment of the present invention.

From FIG. 11, it can be seen that in the case where packets are transmitted using the data transmission method according to an exemplary embodiment of the present invention, the retry rate per packet is much lower than that of the commercialized MadWiFi for the same average error rate, for example, an average error rate of 15% to 20%.

As described above, the method and apparatus for transmitting data in a wireless network according to the exemplary embodiments of the present invention have at least the following advantages.

First, the limited resources of a wireless network can be used efficiently.

Second, the storage unit can be used efficiently.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A data transmission method comprising:
encoding data to be transmitted over a wireless network on a unit basis;
providing transmission data with information for allowing the data to be transmitted to recover from an error being added thereto;
transmitting the transmission data to the wireless network at a first transfer rate;
calculating a transfer success ratio depending on whether the transmission data have been successfully transmitted at the first transfer rate;
storing the transmitted transmission data as data for retransmission at a different transfer rate if the transmitted transmission data is not successfully transferred at the first transfer rate; and
controlling the transmission of the transmission data depending on whether the transfer success ratio is higher than a threshold value,
wherein the controlling the transmission of the transmission data comprises stopping the transmission of untransmitted packets of a current frame, and transmitting packets of a subsequent frame when the transfer success ratio is higher than the threshold value.

2. The method of claim 1, wherein:
the data to be transmitted are video data; and
the method further comprises marking an I frame, a P frame, and a B frame on the data; and
separating the marked data.

3. The method of claim 1, wherein the providing transmission data comprises performing Forward Error Correction (FEC) encoding.

4. The method of claim 1, wherein the providing transmission data comprises interleaving the transmission data.

5. The method of claim 4, further comprising dividing the interleaved transmission data into a plurality of packets and adding a sequential number to the header of each of the packets,
wherein if the sequence in which the packets are transmitted and the sequence in which the packets are received are different, the received packets are sorted using the sequential numbers.

6. The method of claim 1, wherein the calculating the transfer success ratio comprises:
if there are data, the transmission of which has failed, calculating a transfer failure ratio of the transmission data.

7. The method of claim 6, wherein the storing the data comprises:
comparing the transfer failure ratio with an error recovery ratio of the transmission data; and
if the transfer failure ratio is lower than the error recovery ratio, discarding the data, the transmission of which has failed, when the transfer failure ratio is lower than an error recovery ratio of the transmission data.

8. The method of claim 1, wherein the threshold value is determined based on an error recovery ratio of the transmission data.

9. The method of claim 1, wherein the controlling the transmission of the transmission data comprises:
if the transfer success ratio is lower than the threshold value, determining whether the transmission of the transmission data has been completed; and
retransmitting data, the transmission of which has failed, according to results of the determination.

10. The method of claim 9, wherein the retransmitting the data comprises reducing a transfer rate of the data transmission of which has failed.

11. The method of claim 9, wherein the retransmitting the data comprises controlling the retransmission of the data, the transmission of which has failed, depending on whether the transfer success ratio of the transmission data based on the retransmitted data is higher than the threshold value.

12. A data transmitting apparatus comprising:
a video data processing unit encoding data to be transmitted through a wireless network on a unit basis, and providing transmission data with information for allowing the data to be transmitted to recover from an error being added;
a transmission unit transmitting the transmission data to the wireless network at a first transfer rate;
a calculation unit calculating a transfer success ratio of the transmission data transmitted at the first transfer rate;
a storage unit which stores the transmitted transmission data as data for retransmission at a different transfer rate if the transmitted transmission data is not successfully transferred at the first transfer rate; and
a determination unit controlling the transmission of the transmission data depending on whether the transfer success ratio is higher than a threshold value,
wherein the determination unit stops transmission of untransmitted packets of a current frame, and transmits packets of a subsequent frame when the transfer success ratio is higher than the threshold value.

13. The apparatus of claim 12, wherein:
the data to be transmitted are video data; and
the apparatus further comprises a frame separation unit marking an I frame, a P frame, and a B frame on the data and separating the marked data.

14. The apparatus of claim 12, wherein the video data processing unit performs Forward Error Correction (FEC) encoding.

15. The apparatus of claim 12, wherein the video data processing unit interleaves the transmission data.

16. The apparatus of claim 15, wherein the video data processing unit further comprises a transfer packetizer which divides the interleaved transmission data into a plurality of packets and adds a sequential number to the header of each packet,
wherein if the sequence in which the packets are transmitted and the sequence in which the packets are received are different, the received packets are sorted using the sequential numbers.

17. The apparatus of claim 12, wherein the calculation unit calculates a transfer failure ratio of the transmission data.

18. The apparatus of claim 17, wherein the determination unit discards the data, the transmission of which has failed, when the transfer failure ratio is lower than an error recovery ratio of the transmission data.

19. The apparatus of claim 12, wherein the threshold value is determined based on an error recovery ratio of the transmission data.

20. The apparatus of claim 12, wherein the determination unit determines whether the transmission of the transmission data has been completed when the transfer success ratio is lower than the threshold value, and retransmits data, the transmission of which has failed, according to results of the determination.

21. The apparatus of claim 20, wherein the determination unit reduces a transfer rate of the data, the transmission of which has failed.

22. The apparatus of claim 20, wherein the determination unit controls the retransmission of the data, the transmission of which has failed, depending on whether the transfer success ratio of the transmission data based on the retransmitted data is higher than the threshold value.

* * * * *